(12) United States Patent
Zupcau et al.

(10) Patent No.: US 8,576,524 B1
(45) Date of Patent: Nov. 5, 2013

(54) DIODE BASED ESD TRIGGERS (75) Inventors: Dan Zupcau, Colorado Springs, CO (US); Leo Luquette, Monument, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 178 days.

(21) Appl. No.: 13/235,714

(22) Filed: Sep. 19, 2011

(51) Int. Cl.
*H02H 9/00* (2006.01)
(52) U.S. Cl.
USPC .......................................................... 361/56
(58) Field of Classification Search
USPC .......................................................... 361/56
See application file for complete search history.

(56) References Cited

U.S. PATENT DOCUMENTS

| 7,593,204 | B1 * | 9/2009 | Iversen et al. | 361/56 |
| 7,885,047 | B2 * | 2/2011 | Deval et al. | 361/56 |
| 2003/0151877 | A1 * | 8/2003 | Young et al. | 361/212 |
| 2004/0252426 | A1 * | 12/2004 | Hargrove et al. | 361/56 |
| 2006/0152870 | A1 * | 7/2006 | Chen et al. | 361/56 |
| 2007/0285854 | A1 * | 12/2007 | Rodgers et al. | 361/56 |
| 2007/0297106 | A1 * | 12/2007 | Dai et al. | 361/56 |

* cited by examiner

*Primary Examiner* — Scott Bauer (57) ABSTRACT

An electrostatic discharge (ESD) detector is coupled to the input voltage, and includes a voltage modulated input capacitance Cj configured to decrease as the input voltage increases. An output pulse generator is coupled to an output of the detector, and configured to amplify the output of the detector. An ESD protection switch is coupled to turn on upon application of an output pulse from the output pulse generator.

20 Claims, 6 Drawing Sheets

DIODE BASED ESD TRIGGERS

BACKGROUND

An electrostatic discharge (ESD) event injects a significant amount of charge through an input terminal of a circuit (often, an integrated circuit). Without some sort of protection, the high currents and voltages associated with the ESD event may damage the circuit. To protect the circuit, the ESD event may be detected and a signal may be created in response. The signal may be applied to a switch or other mechanism (i.e., an ESD clamp) to direct enough ESD charge to ground to prevent circuit damage.

Conventional power supply rail-based ESD protection mechanisms use slew rate sensitive sensors (ESD triggers) which apply fixed RC time constants to activate, during ESD events, a set of voltage controlled current switches called ESD clamps or switches, coupled across the power supply rails (e.g., vcc to ground). Fixed RC time constant ESD triggers may erroneously activate the ESD clamps during excessive power supply noise, affecting the power supply value of the protected circuit and thus its performance parameters (for example access time for a memory integrated circuit).

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations of memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic is a design decision that will vary according to implementation.

The term "voltage modulated input capacitance" refers to a capacitance in an ESD event detector circuit, configured between a transmission line along which an ESD event propagates (such as a power rail) and additional components of the ESD event detector. The term "nonlinear voltage/impedance characteristic" means that the impedance of an electrical component varies in a nonlinear way with changes to the voltage potential across the component. The term "diode" refers to diode electrical components, for example junction diodes, of various types, sizes, and manufactured characteristics. The term "noise" used in conjunction with voltages or other signals refers to (typically sudden) variations in the voltage/signal values from their nominal operating point. The term "diode multiplier" or "diode multiplicity" refers to the ratio between the area of the conductive region of a diode relative to the area of the conductive region of another diode. The term "slew rate" refers to the time rate of change of a voltage/current value. References to inputting a voltage, or an "input voltage", refer to application of the voltage from an external source to the circuit or component described in the context. For example, an "input voltage" to an ESD detector is a voltage provided to the detector from an external source, such as a supply voltage for the circuit that the ESD detector protects.

Overview

An ESD event detector employs a voltage modulated input capacitance in order to distinguish between ESD events (e.g., human body mode ESD events) from functional mode power supply noise events. The voltage modulated input capacitance is used in conjunction with a resistor in order to detect an ESD event and activate power rail-based ESD protection circuitry. The capacitance of the device used in the ESD event detector is reduced as the voltage across it increases. Consequently, the ESD trigger using the respective ESD event detector is able to respond to an ESD event (when the voltage across the variable capacitance device is small and its capacitance is large), while having decreased power supply noise sensitivity in functional mode (when the voltage across the voltage modulated input capacitance is large, typically equal to the power supply, and its capacitance is small).

Description of Various Embodiments

Figure 1:
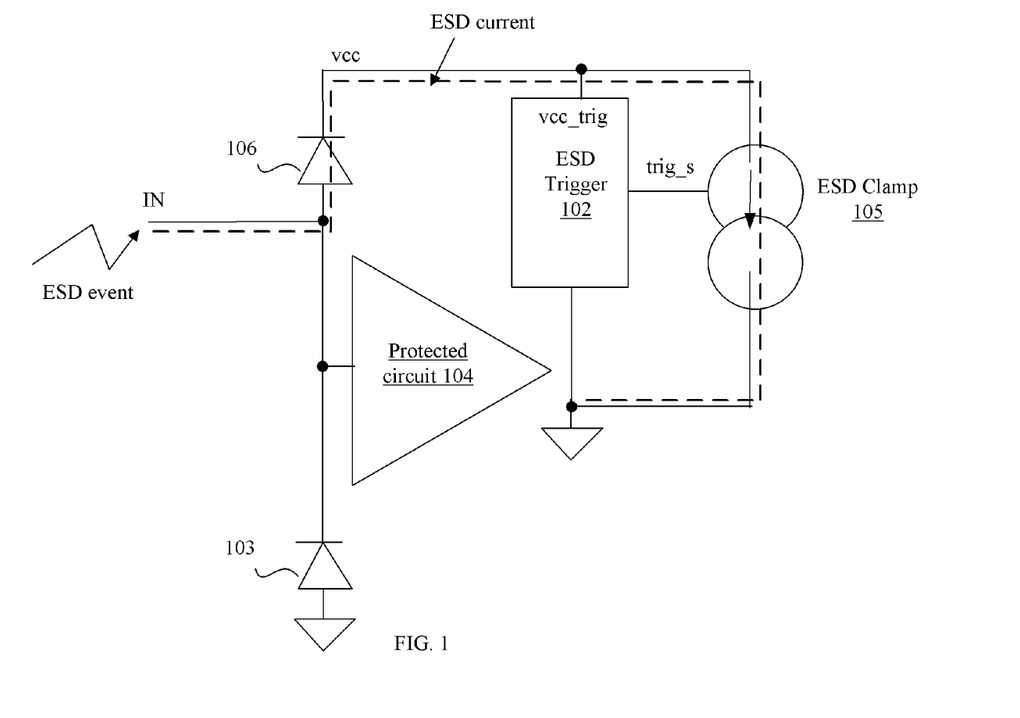
FIG. 1 illustrates an ESD event occurring at pin IN of an integrated circuit.

An ESD event injects a significant amount of electrical charge to an ungrounded integrated circuit pin, referred to as the zapped pin, in a very short time, usually hundreds of nanoseconds (ns) or less. FIG. 1 illustrates an ESD event occurring at pin IN of an integrated circuit. Without adequate ESD protection circuitry, the high currents and voltages associated with the ESD event can damage the protected circuit 104 which is coupled to the zapped pin IN.

The ESD protection circuitry for the protected circuit 104 in FIG. 1 comprises: (1) ESD diodes 103 and 106, which are reverse biased during the normal functional mode of the respective integrated circuit (i.e. when the power supply vcc and the ground are at their normal operating voltage values) (2) a detector 102 that detects the ESD event, referred to as ESD Trigger, and (3) a voltage controlled current switch 105, also referred to as an ESD clamp. When ESD charge is injected at the zapped pin IN during an ESD event, the ESD diode 106 becomes forward biased, allowing the respective ESD current to be diverted away from the protected circuit 104 to the power supply bus vcc. The ESD trigger 102 monitors the signal on the vcc bus and generates an output pulse trig_s of appropriate duration if it detects an ESD event. During an ESD event (and not at any other times during proper operation), the output trig_s of the ESD trigger activates an ESD clamp 105, which allows the ESD current to flow from the vcc bus to ground. Consequently, during the ESD event, the ESD current is diverted away from the protected circuit 104, through the forward biased ESD diode 106, through the power supply bus vcc, and through the activated ESD clamp 105 to ground.

One standard used to qualify the ESD performance of an integrated circuit is the HBM (human body model) standard JESD22-A114-B (JEDEC JESD-A114E "Electrostatic Discharge (ESD) Sensitivity Testing Human Body Model (HBM)", January 2007, Standard body: joint ESDA/JEDEC JS-001, Revision:E, Date: 2007). An HBM generator includes a capacitor (e.g., 100 pF) which is charged to a specified HBM voltage. The charge stored in the capacitor is then discharged through a resistor (e.g., 1500 Ohm) to a device under test (DUT), and the voltage across the DUT is then recorded. Per the JESD22-A114-B standard, an HBM ESD event has 2 ns to 10 ns ESD current rise time and an ESD event duration of more than 350 ns.

Figure 2:
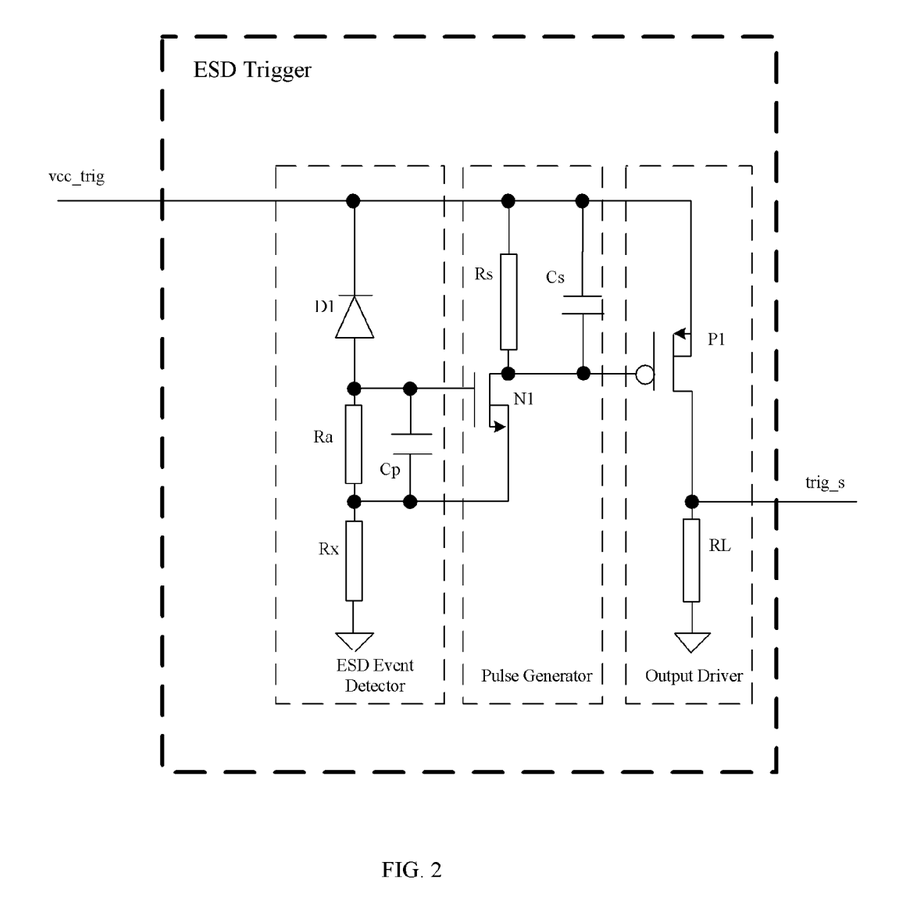
FIG. 2 illustrates a first embodiment of a diode based ESD trigger.

FIG. 2 illustrates a first embodiment of a diode based ESD trigger logic. The ESD trigger logic includes three sub-blocks: an ESD event detector, a Pulse Generator, and an Output Driver. The ESD event detector includes a diode D1 in series with two resistors (Ra, Rx) and a capacitor Cp connected in parallel with the resistor Ra. The diode D1, resistor Ra and resistor Rx are connected in series between the input vcc_trig of the ESD trigger and ground. Diode D1 is configured to be in reverse bias mode during the normal functional mode of the respective chip, i.e. when the power supply vcc_trig is at its normal operating value. Examples of normal operating values are 5V, 3V and 1.8V. Due to the fact that the diode D1 is in reverse bias mode, the current passing through it is small (e.g., 10 nA at 25 C junction temperature) and consequently, the voltage drop across the resistors Ra, Rx (eg. 5Kohm resistance for each of them) is close to 0V (e.g., 10 nA*10 Kohm=100 μV for the current and resistor values given before). Thus during the normal functional mode (when the protected circuit is powered and vcc_trig is the power supply value) nFET N1 in the Pulse Generator stage has both its gate and its source close to ground potential, with the effect that the ESD trigger is not active. Resistor Rx is used to limit the current through diode D1 in the event diode D1 is forward biased, for example when the ESD charge is applied to the ground pin in FIG. 1; in that case the vcc_trig potential is lower than the local ground potential during the respective ESD event.

The ESD event detector generates a pulse between the gate and the source of nFET N1 when the voltage across diode D1 is smaller than the reverse bias voltage breakdown of the respective diode, and the voltage across resistor Ra is $$Ra*Cj*d(vcc\_trig)/dt > Vth(N1) \quad (1)$$

where Cj is the junction capacitance of diode D1 in reverse bias mode, and Vth(N1) is the nFET N1 threshold voltage and d(vcc_trig)/dt is the voltage slew rate at pin vcc_trig. The ESD event detector thus activates nFET N1 only during sufficiently high products of the junction capacitance Cj and the voltage slew rate at the vcc_trig pin of the ESD trigger, for a given resistance Ra. The value Ra may thus be used to tune the slew rate activation range of the detector, as can the value of Cj, an inherent characteristic of the chosen diode D1. The ESD event detector's sensitivity to voltage slew rate events at node vcc_trig will thus decrease as Cj decreases, and Cj decreases as the reverse bias voltage on D1 increases (as the part power supply is ramped up at power-up time or is constant and large, e.g., 3.3V, in normal functional mode).

The Pulse Generator includes a voltage level detector implemented with nFET N1 and a pulse extender implemented with the parallel RC circuit $R_S, C_S$.

If condition (1) is satisfied, a short pulse of nFET N1 drain current ensues, generating a voltage pulse across the $R_S C_S$ tank circuit. The pFET P1 is activated if the voltage across the $R_S C_S$ tank circuit is larger than its threshold voltage. In that condition and only in that condition, pFET P1 generates a pulse of drain current, creating a voltage pulse at the trig_s output of the ESD Trigger, across resistor RL, which in turn activates the respective ESD clamps. The $R_S * C_S$ time constant dictates the pulse width of the activation pulse thus generated. The pulse width of trig_s is proportional with the time constant $R_S * C_S$, which in one embodiment is chosen to be between 1 μs and 1.5 μs. The pulse width at the trig_s output during an ESD event (defined as the time between the rising and the falling of the trig_s signal through a voltage level equal to the threshold of the FET device which is used as an ESD Clamp) is set sufficiently large to enable the ESD clamps controlled by trig_s to discharge to ground the ESD charge injected at the zapped pad during an ESD event.

In case there is no ESD event, then $$Ra*Cj*d(vcc\_trig)/dt < Vth(N1) \quad (2)$$

thus nFET N1 is OFF and does not generate any drain current and thus pFET P1 remains OFF, it does not generate drain current and thus no voltage pulse is generated at the trig_s output to activate the ESD clamps.

The junction capacitance Cj of diode D1 is larger if its reverse bias voltage is small (e.g., less than 50 mV, immediately after the onset of the ESD event) and decreases as the reverse bias voltage level increases (e.g., 3.3V, in normal functional mode). Consequently, Cj has its largest value immediately after the onset of an unpowered ESD event (e.g. onset of a HBM event when vcc_trig potential is close to the ground potential). When the chip incorporating the ESD trigger is in normal (powered) functional mode, the reverse bias voltage on the diode D1 can be equal to the power supply value, decreasing its capacitance compared to the value it had at the onset of the ESD event. This causes the ESD trigger to have lower sensitivity to power supply noise, i.e. condition (1) is never satisfied for the voltage slew rate values corresponding to power supply noise.

At times the voltage across diode D1 may exceed the reverse bias breakdown voltage of D1. This may occur for example if the respective diode is small and the condition Ra*Cj*d(vcc_trig)/dt>Vth (N1) would not be satisfied for any ESD event slew rate value d(vcc_trig)/dt, for a given value of resistor Ra. Under these conditions, if $$Ib*Ra > Vth(N1) \tag{3}$$

nFET N1 becomes active and generates a pulse of drain current, activating the ESD trigger which in turn activates the respective ESD clamps. In equation (3) Ib is the respective breakdown current for the diode D1.

Resistor Rx has the function to limit the current through the diode D1 during negative ESD zaps. In that particular situation diode D1 is forward biased and resistors Ra and Rx limit the forward bias current through the D1 diode, thus avoiding that excessive forward bias current may affect it.

Figure 7:
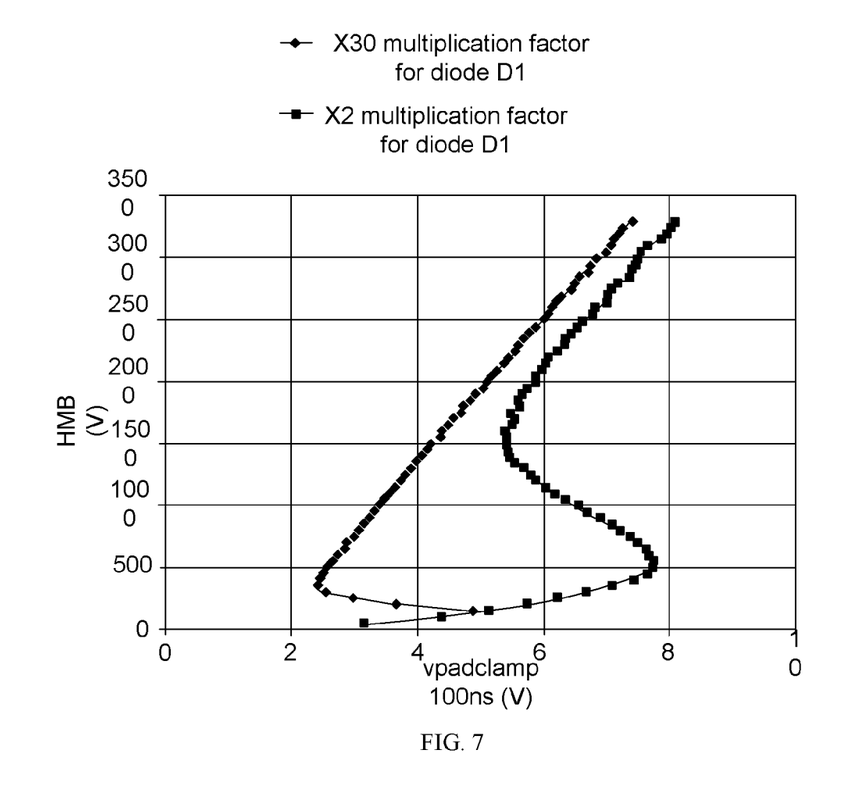
FIG. 7 illustrates the simulated zapped pad clamped voltage at 100 ns from the ESD event versus the HBM voltage values for and rail-based ESD Network using the ESD trigger embodiment described in FIG. 2, for 2× and 30× multiplication factors for diode D1, respectively.

The ESD protection HBM voltage versus clamped voltage characteristic trigger point (value of the clamped voltage at the zapped pad measured after a specified time after the ESD event, e.g. 100 ns, for which the characteristic of the ESD protection circuitry using the respective ESD trigger changes from positive to negative slope, as shown in FIG. 7) may be adjusted by sizing the diode D1: larger D1 size will cause the trigger point voltage to decrease, smaller D1 size will cause the trigger point voltage to increase. Consequently, the D1 diode size can be used to adapt the ESD performance to the power supply voltage of the protected circuitry. Capacitor Cp is used to adjust the power supply noise sensitivity of the ESD trigger in normal operating mode. A larger diode D1 size requires larger capacitor Cp values in order to decrease the ESD trigger power supply noise sensitivity in functional mode. The design of this type of ESD trigger requires a trade-off between area, ESD protection performance (trigger point defined as the point in the HBM voltage versus clamped voltage at the zapped pad characteristic changes slope from positive value to negative value, as shown in FIG. 7; the trigger point is defined by the trigger voltage on the X axis and the trigger current on the Y axis), and power supply noise sensitivity.

Figure 3:
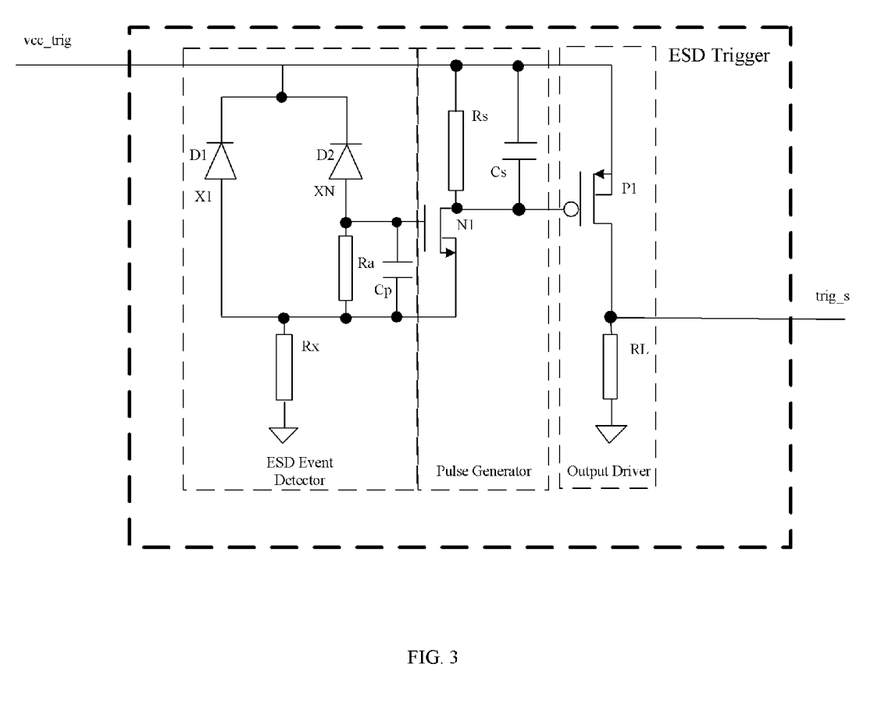
FIG. 3 illustrates a second embodiment of a diode based ESD trigger.

FIG. 3 illustrates a second embodiment of a diode based ESD trigger architecture. The ESD event detector is composed of two diodes D1, D2, two resistors Ra and Rx, and a capacitor Cp connected in parallel with resistor Ra. Diode D2 has a multiplication factor of N, and thus it has a higher junction capacitance at a given reverse bias voltage, compared with the diode D1. Diode D2 is connected in series with resistor Ra and diode D1 is connected in parallel with both D2 and Ra. Resistor Rx is connected between the positive terminal of diode D1 and ground.

Two conditions can result in a voltage pulse that will activate the nFET N1, thus activating the ESD trigger in FIG. 3. First, an activation of the ESD event detector, and thus of the ESD trigger, will occur when the voltage across diode D1 is smaller than the reverse bias voltage breakdown of the D1 diode, and the voltage across resistor Ra is $$Ra*Cj*d(vcc\_trig)/dt > Vth(N1) \tag{4}$$

where Cj is the junction capacitance of diode D2, Vth(N1) is the threshold voltage of the nFET N1 and d(vcc_trig)/dt is the voltage slew rate at input vcc_trig. Second, an ESD trigger activation will occur if the voltages across diodes D1, D2 are larger than their respective reverse bias breakdown voltage values, and the voltage across resistor Ra is $$Ib*Ra > Vth(N1) \tag{5}$$

where Ib is the reverse breakdown current for diode D2 and Vth(N1) is the threshold voltage of the nFET N1. If there is no ESD event, neither of the conditions (4) or (5) are satisfied and no current is generated in the drain of nFET N1, with the final result being that the ESD trigger is not activated. The Pulse Generator and the Output Driver sub-blocks operate similarly to those in FIG. 2. Resistor Rx limits the current through the diodes D1, D2 during negative ESD zap events (vcc_trig potential is lower than the local ground potential during the respective ESD event). The trigger point of the HBM voltage versus clamped voltage characteristic of the ESD protection circuitry using the respective ESD trigger may be determined by selecting the diode D2 multiplicity factor N and by the value of the resistor Ra. Capacitor Cp is used to adjust the power supply noise sensitivity; a larger value for capacitor Cp will decrease the power supply noise sensitivity of the ESD Trigger. A larger multiplication factor N requires larger capacitor Cp values in order to keep the respective ESD trigger from becoming activated during large power supply noise events.

Figure 4:
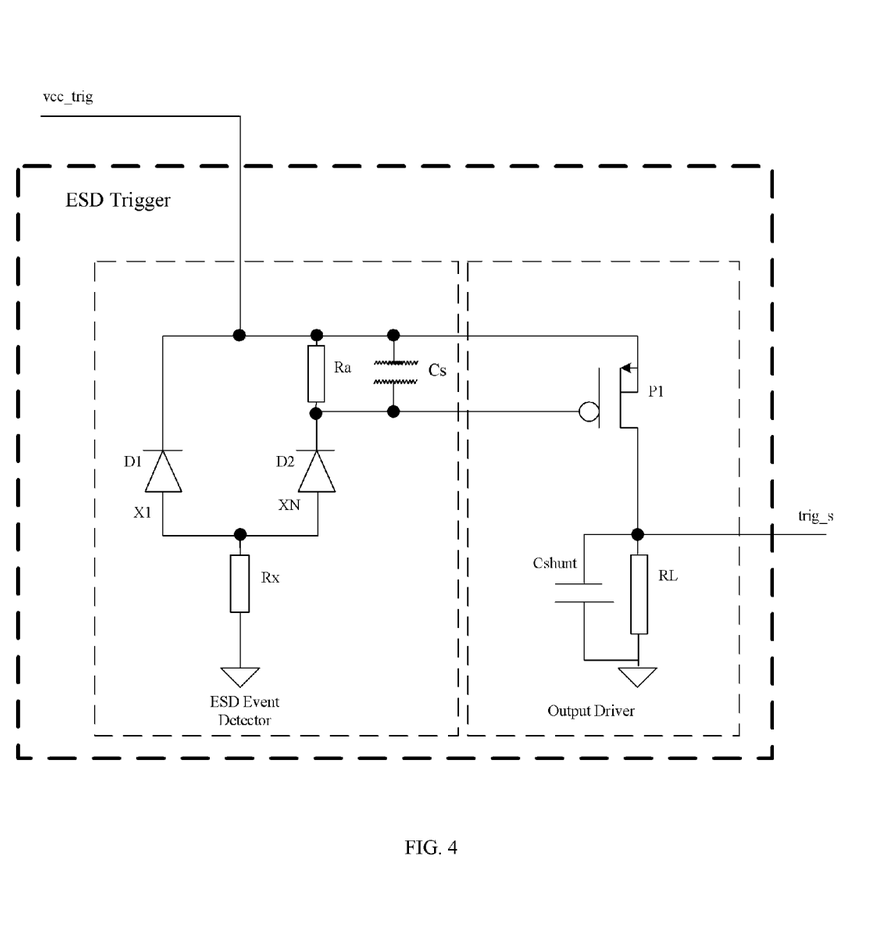
FIG. 4 illustrates a third embodiment of a diode based ESD trigger.

FIG. 4 illustrates a third embodiment of a diode based ESD trigger architecture. The ESD event detector comprises diodes D1, D2, resistors Ra and Rx and a capacitor Cp connected in parallel with resistor Ra. Diode D2 has a multiplication factor of N compared with the diode D1. Diode D2 is connected in series with resistor Ra and diode D1 is connected in parallel with both D2 and Ra. Resistor Rx is connected between the positive terminal of diode D1 and ground. Diodes D1, D2 are configured to be in reverse bias mode during the normal (powered) operation of the circuit they protect. The ESD event detector triggers under conditions similar to those described in conjunction with FIG. 3. The intermediate Pulse Generator stage corresponding to the ESD trigger shown in FIG. 2 is eliminated, and the input capacitance Cshunt of the respective ESD Clamp is used in conjunction with resistance RL to sustain the output pulse trig_s above the voltage threshold of the ESD Clamp nFET for the necessary duration to discharge to ground the ESD charge injected at the zapped pin (refer to FIG. 1). It is to be noted that the respective ESD Clamp can be an nFET transistor selected to be able to conduct the large amount of ESD current during an ESD event, thus having a large gate capacitance Cshunt. This ESD trigger embodiment may have the advantage of requiring substantially less circuit area than the ESD trigger embodiments employing an intermediate pulse generator circuit, such as the ones shown in FIGS. 2 and 3. Substitution of the ESD Clamp input capacitance for the intermediate pulse generator circuit capacitance is applicable to any of the embodiments described herein, and variations thereof.

Figure 5:
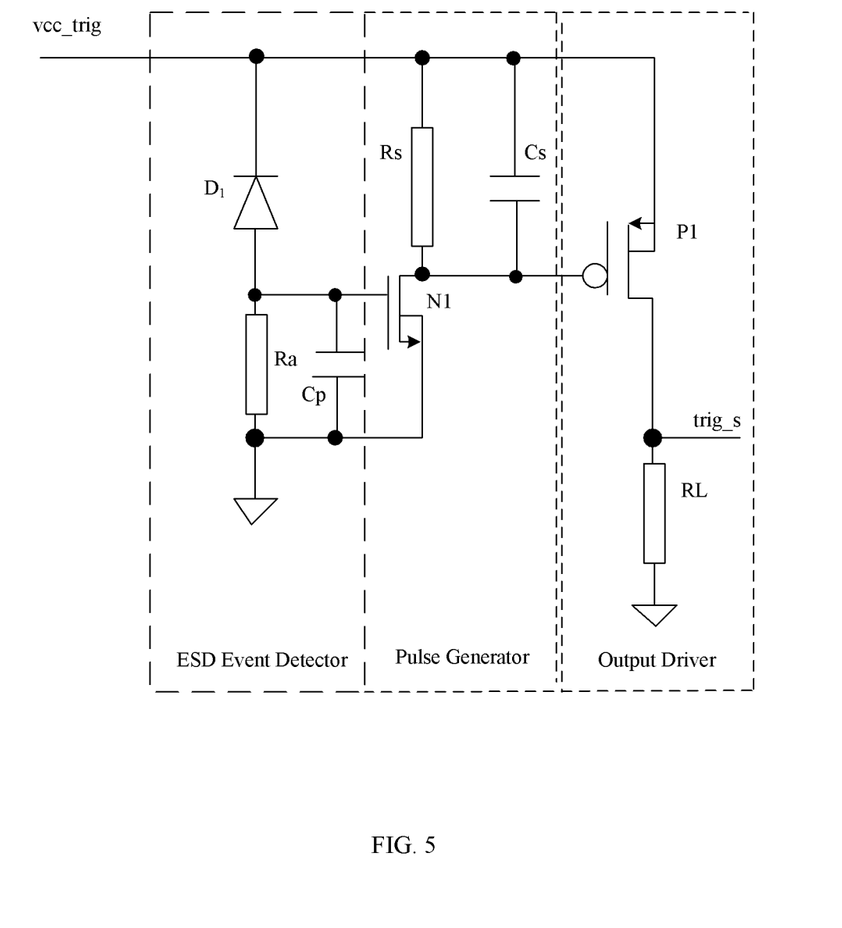
FIG. 5 illustrates a version of the diode based ESD trigger architecture in FIG. 2 in which resistor Rx is eliminated.

FIG. 5 illustrates an embodiment in which resistor Rx in the diode based ESD trigger shown in FIG. 2 is eliminated. This modification may be applied to any of the previously described embodiments, and variations thereof. The ESD trigger circuit becomes active under conditions similar to those described in conjunction with FIG. 2. The ESD trigger circuit is more susceptible to negative zap damage to D1, due to less current limiting through that diode when it becomes forward biased, although resistor Ra will limit the current through D1 during negative zaps.

Figure 6:
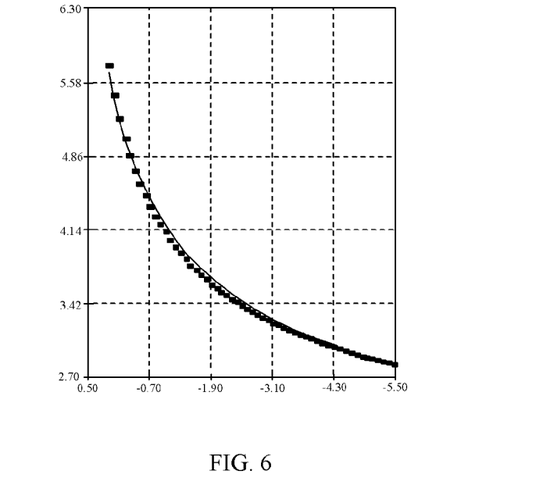
FIG. 6 illustrates an exemplary variation in the junction capacitance of a diode used in the described embodiments as a function of its reverse bias voltage.

FIG. 6 illustrates an exemplary variation in the junction capacitance of a diode used in the described embodiments over a range or reverse bias voltages. As the reverse bias voltage increases, the reverse bias regimen junction capacitance decreases. Thus, the ESD event sensitivity of an ESD trigger may be selected to be high (for small reverse bias voltage values) while the power supply noise sensitivity in normal functional mode may be low (for reverse voltage bias values equal to the power supply voltage, eg. 3.3V); consequently, the sensitivity of the respective ESD trigger may be varied according to whether or not the ESD trigger circuit is reacting to an ESD event or is in normal operation, and may in fact vary during the occurrence of an ESD event or power supply noise event itself. An ESD trigger may exploit this time/voltage modulated capacitance in one or more diodes to improve power supply noise sensitivity in functional mode while accurately triggering on true ESD events.

FIG. 7 illustrates the simulated zapped pad clamped voltage at 100 ns from the ESD event versus the HBM voltage values for a power rail-based ESD Network using the ESD trigger embodiment described in FIG. 2. It can be seen that by increasing the diode D1 multiplicity factor N one can control the trigger voltage and trigger current values (the point in the respective graph when the slope first changes from positive value to negative value): trigger voltage decreases with increased N value. This result shows that the respective multiplication factor for diode D1 in the ESD Trigger in FIG. 2 can be used to adapt the ESD performance of the respective rail-based ESD Network to maximum voltage requirements of the protected FET devices (for example, in some implementations the maximum clamped voltage at the zapped pad relative to local ground at 100 ns from the ESD event can not be larger than the maximum voltage allowed between any of the two terminals of the protected device during an ESD event; in case this condition is not satisfied, the protected circuit may be damaged during an ESD event). In some implementations, the diode D1 multiplicity factor can be selected to be large (for example 30) in order for the rail-based ESD Network using that ESD trigger to be able to protect more sensitive FET devices (for example low threshold FET devices compatible with 1.2V power supply in 65 nm CMOS technology). In other implementations, the diode D1 multiplicity factor can be selected to be small (for example 2) in order for the rail-based ESD Network using that ESD trigger to be able to protect less sensitive FET devices (for example high threshold FET devices compatible with 3.3V power supply in 65 nm CMOS technology); consequently, the ESD Trigger area required in this case will be smaller, due to the fact that diode D1 requires a smaller area.

Implementations and Alternatives

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A circuit comprising:
an electrostatic discharge (ESD) detector comprising a voltage modulated input capacitance Cj configured to decrease as an input voltage to the detector increases, the capacitance Cj provided by at least one electrical component with a nonlinear voltage/impedance characteristic;
an output pulse generator configured to amplify an output of the detector; and
a capacitance Cp different from Cj, the circuit configured such that its sensitivity to detecting ESD events and rejecting noise is set based on selection of (a) a conductive area size of the nonlinear electrical component, and (b) Cp.

2. The circuit of claim 1, wherein the nonlinear at least one electrical component is one or more diodes.

3. The circuit of claim 2, wherein the one or more diodes are configured to be reverse biased by the input voltage.

4. The circuit of claim 2, further comprising a first diode D1 and a second diode D2, wherein D2 has a multiplicity factor N in relation to D1 and D1 has a conductive area of a particular size.

5. The circuit of claim 4, wherein D1 and D2 are configured in parallel relative to the input voltage.

6. A circuit comprising:
a protected circuit coupled to an input voltage;
an electrostatic discharge (ESD) detector coupled to the input voltage, the detector comprising a voltage modulated input capacitance Cj configured to decrease as the input voltage increases, wherein Cj is provided by at least one electrical component with a nonlinear voltage/impedance characteristic;
an output pulse generator configured to amplify an output of the detector into an output pulse;
an ESD protection switch coupled to turn on upon application of the output pulse from the output pulse generator; and
a capacitance Cp different from Cj, the circuit configured such that its sensitivity to detecting ESD events and rejecting noise is set based on selection of (a) a conductive area size of the nonlinear electrical component, and (b) Cp.

7. The circuit of claim 6, wherein the nonlinear at least one electrical component is one or more diodes.

8. The circuit of claim 7, wherein the one or more diodes are configured to be reverse biased by the input voltage.

9. The circuit of claim 8, further comprising a first diode D1 and a second diode D2, wherein D2 has a multiplicity factor N in relation to D1 and D1 has a conductive area of a particular size.

10. The circuit of claim 9, wherein D1 and D2 are configured in parallel relative to the input voltage.

11. A method of protecting a circuit from ESD events, comprising:
applying an input voltage to an ESD detector that has a capacitance Cj that decreases as the input voltage increases;
generating a signal to shunt a power supply of a protected circuit to a ground bus if a slew rate of the input voltage exceeds a preset threshold value; and
setting a sensitivity and noise rejection of the detector by selecting a value for Cj and a value for a second capacitance Cp of the detector.

12. The method of claim 11, further comprising:
applying the input voltage to a slew rate detector through one or more electrical components having a nonlinear voltage/impedance characteristic.

13. The method of claim 12, further comprising:
applying the input voltage to the slew rate detector through one or more diodes.

14. The method of claim 13, further comprising:
applying the input voltage to the slew rate detector through a single diode configured to be reverse biased by the input voltage.

15. The method of claim 13, further comprising:
applying the input voltage to the slew rate detector through two or more diodes each configured to be reverse biased by the respective input voltage.

16. An apparatus comprising: a protected circuit;
an electrostatic discharge (ESD) detector that has a capacitance Cj that decreases as the input voltage increases, wherein the ESD detector includes a capacitance Cp different from Cj; and
a power supply coupled to apply an input voltage to the protected circuit and to the ESD detector;
wherein the ESD detector is configured to generate a signal to shunt the input voltage of the protected circuit to a ground bus if a slew rate of the input voltage exceeds a preset threshold value; and
wherein a sensitivity and noise rejection of the ESD detector are set based on selection of a value for Cj and a value for Cp.

17. The apparatus of claim 16, wherein the ESD detector comprises one or more electrical components having a nonlinear voltage/impedance characteristic.

18. The apparatus of claim 17, wherein the one or more electrical components are one or more diodes configured to be reverse biased by the input voltage.

19. The apparatus of claim 18, the ESD detector further comprising a first diode D1 and a second diode D2, wherein D2 has a multiplicity factor N in relation to D1 and D1 has a conductive area of a particular size.

20. The apparatus of claim 19, wherein D1 and D2 are configured in parallel relative to the input voltage.

* * * * *